United States Patent
Wilson et al.

(10) Patent No.: US 8,925,574 B2
(45) Date of Patent: Jan. 6, 2015

(54) VEHICLE AXLE VENT SYSTEM

(75) Inventors: Matt J. Wilson, Canal Fulton, OH (US);
Jay D. White, Massillon, OH (US);
Jesse W. Cervantez, Navarre, OH (US);
Stephen H. Burke, Commerce Township, OH (US)

(73) Assignee: Hendrickson USA, L.L.C., Itasca, IL (US)

( * ) Notice: Subject to any disclaimer, the term of this patent is extended or adjusted under 35 U.S.C. 154(b) by 87 days.

(21) Appl. No.: 13/588,289

(22) Filed: Aug. 17, 2012

(65) Prior Publication Data

US 2013/0139911 A1    Jun. 6, 2013

Related U.S. Application Data

(60) Provisional application No. 61/524,476, filed on Aug. 17, 2011.

(51) Int. Cl.
*F16K 17/00* (2006.01)
*F16K 15/00* (2006.01)
*B60B 35/08* (2006.01)
*B60B 35/16* (2006.01)

(52) U.S. Cl.
CPC .................. *F16K 15/00* (2013.01); *B60B 35/08* (2013.01); *B60B 35/163* (2013.01); *B60B 2900/5116* (2013.01); *B60B 2900/731* (2013.01)
USPC ........... 137/351; 137/846; 137/854; 137/539; 137/542; 137/860; 74/606 R

(58) Field of Classification Search
USPC ......... 137/251, 352, 540, 542, 854, 351, 846, 137/539, 860; 152/417; 301/124.1, 108.1; 464/17; 74/606 R, 607

See application file for complete search history.

(56) References Cited

U.S. PATENT DOCUMENTS

| | | | | |
|---|---|---|---|---|
| 2,168,695 A | * | 8/1939 | Kumaki | 128/201.15 |
| 2,803,265 A | * | 8/1957 | Coffey | 137/516.21 |
| 3,192,946 A | | 7/1965 | Wiersholm | |
| 3,314,306 A | * | 4/1967 | Barclae | 74/606 R |
| 4,284,212 A | | 8/1981 | Caswell | |
| 4,299,248 A | | 11/1981 | Becker et al. | |
| 4,351,203 A | * | 9/1982 | Fukunaga | 74/606 R |
| 4,506,562 A | * | 3/1985 | Yamaura et al. | 74/606 R |
| 4,557,526 A | | 12/1985 | Smith | |
| 4,714,128 A | * | 12/1987 | Yoshinaka et al. | 180/247 |

(Continued)

*Primary Examiner* — John K Fristoe, Jr.
*Assistant Examiner* — R. K. Arundale
(74) *Attorney, Agent, or Firm* — Dureska, Kennedy & Moore, L.L.C.; David P. Dureska; Edward T. Kennedy

(57) ABSTRACT

A vent system for an axle of a heavy-duty vehicle includes a check valve and an exhaust tube that is connected to the check valve. The check valve includes a first end that is mounted on the axle, a second end, and a body that is disposed between the first and second ends and is in selective fluid communication with the axle interior. The exhaust tube includes a first end that is mounted on the second end of the check valve, and a second end that is open to atmosphere and is in fluid communication with the check valve body. Using any one of a number of types of configurations for the valve body, the vent system selectively exhausts air from the axle interior to atmosphere to relieve buildups of pressure in the axle, while protecting the integrity of the check valve and preventing contaminants from entering the axle.

18 Claims, 8 Drawing Sheets

(56) References Cited

U.S. PATENT DOCUMENTS

| | | | |
|---|---|---|---|
| 4,794,942 A * | 1/1989 | Yasuda et al. | 137/197 |
| 4,970,913 A * | 11/1990 | Kielar et al. | 74/606 R |
| 5,024,345 A * | 6/1991 | Deweerdt | 220/366.1 |
| 5,031,876 A | 7/1991 | Giacomini | |
| 5,505,525 A | 4/1996 | Denton | |
| 5,724,864 A * | 3/1998 | Rodgers et al. | 74/606 R |
| 5,901,742 A | 5/1999 | Kleppner et al. | |
| 6,024,417 A | 2/2000 | Jones, II et al. | |
| 6,123,175 A * | 9/2000 | Fett | 184/59 |
| 6,145,559 A * | 11/2000 | Ingram, II | 152/417 |
| 6,325,463 B1 | 12/2001 | Sitter et al. | |
| 6,725,743 B2 | 4/2004 | White | |
| 6,840,137 B2 * | 1/2005 | Kaplan et al. | 74/606 R |
| 7,131,262 B2 | 11/2006 | Sealy et al. | |
| 7,597,114 B2 * | 10/2009 | Buckingham et al. | 137/433 |
| 7,866,231 B2 * | 1/2011 | Kincaid et al. | 74/607 |
| 8,529,657 B2 * | 9/2013 | Kincaid et al. | 55/385.3 |
| 2003/0010151 A1 * | 1/2003 | Johnson et al. | 74/606 R |
| 2010/0029424 A1 | 2/2010 | Palomaki et al. | |

* cited by examiner

VEHICLE AXLE VENT SYSTEM

CROSS-REFERENCE TO RELATED APPLICATIONS

This application claims the benefit of U.S. Provisional Patent Application Ser. No. 61/524,476, which was filed on Aug. 17, 2011.

BACKGROUND OF THE INVENTION

1. Technical Field

The invention relates to vent systems for axles. More particularly, the invention relates to a vent system for axles of heavy-duty vehicles such as trucks and tractor-trailers or semi-trailers. Still more particularly, the invention is directed to an axle vent system that includes a check valve that is mounted on an axle and is in fluid communication with the interior of the axle, and an exhaust tube which is fluidly connected to the check valve. The system relieves pressure build-up in the axle and in a wheel end assembly that is mounted on the axle, while protecting the integrity of the check valve and preventing contaminants from entering the axle and wheel end assembly, thereby extending the life of the components of the wheel end assembly.

2. Background Art

It is to be understood that the axle vent system of the present invention may be employed on heavy-duty vehicles that include tire inflation systems, and on heavy-duty vehicles that do not include tire inflation systems, and that reference herein is made to heavy-duty vehicles with tire inflation systems only by way of example. Heavy-duty vehicles typically include trucks and tractor-trailers or semi-trailers. Tractor-trailers and semi-trailers, which shall collectively be referred to as tractor-trailers for the purpose of convenience, include at least one trailer, and sometimes two or three trailers, all of which are pulled by a single tractor. All heavy-duty vehicles that are trucks or tractor-trailers include multiple tires, each of which is inflated with a fluid or gas, such as air, to an optimum or recommended pressure, which is known in the art as the target pressure.

However, it is well known that air may leak from a tire, usually in a gradual manner, but sometimes rapidly if there is a problem with the tire, such as a defect or a puncture caused by a road hazard. As a result, it is necessary to regularly check the air pressure in each tire to ensure that the tires are not significantly below the target pressure and thus under-inflated. Should an air check show that a tire is under-inflated, it is desirable to enable air to flow into the tire to return it to the target pressure. Likewise, it is well known that the air pressure in a tire may increase due to increases in ambient air temperature, so that it is necessary to regularly check the air pressure in each tire to ensure that the tires are not greatly above the target pressure and thus over-inflated. Should an air check show that a tire is over-inflated, it is desirable to enable air to flow out of the tire to return it to the target pressure.

The large number of tires on any given heavy-duty vehicle setup makes it difficult to manually check and maintain the target pressure for each and every tire. This difficulty is compounded by the fact that trailers of tractor-trailers or trucks in a fleet may be located at a site for an extended period of time, during which the tire pressure might not be checked. Any one of these trailers or trucks might be placed into service at a moment's notice, leading to the possibility of operation with under-inflated or over-inflated tires. Such operation may increase the chance of less-than-optimum performance and/or reduced life of a tire in service as compared to operation with tires at the target pressure, or within an optimum range of the target pressure.

Moreover, should a tire encounter a condition as the vehicle travels over-the-road that causes the tire to become under-inflated, such as developing a leak from striking a road hazard, the life and/or performance of the tire may be significantly reduced if the under-inflation continues unabated as the vehicle continues to travel. Likewise, should a tire encounter a condition that causes it to become significantly over-inflated, such as increasing pressure from an increased ambient air temperature, the life and/or performance of the tire may be significantly reduced if the over-inflation continues unabated as the vehicle continues to travel. The potential for significantly reduced tire life typically increases in vehicles such as trucks or tractor-trailers that travel for long distances and/or extended periods of time under such less-than-optimum inflation conditions.

Such a need to maintain the target pressure in each tire, and the inconvenience to the vehicle operator having to manually check and maintain a proper tire pressure that is at or near the target pressure, led to the development of tire inflation systems. In these systems, a target inflation pressure is selected for the vehicle tires. The system then monitors the pressure in each tire and attempts to maintain the air pressure in each tire at or near the target pressure by inflating the tire when the monitored pressure drops below the target pressure. These prior art tire inflation systems inflate the tires by providing air from the air supply of the vehicle to the tires by using a variety of different components, arrangements, and/or methods. Certain prior art systems are also capable of deflation, and these systems deflate the tires when the monitored pressure rises above the target pressure by venting air from the tires to atmosphere.

One type of arrangement for tire inflation systems involves running a pneumatic supply conduit or line through the axle, which is hollow, to a rotary union that is mounted in the end of the axle spindle or on a hubcap of the wheel end assembly. The rotary union is an airtight rotating seal that enables fluid communication between the non-rotating axle and the rotating tire. Should the supply line experience a leak or rupture, or should the rotary union experience a leak, air pressure may build up in the hollow axle and the wheel end assembly. If the pressure build-up remains unrelieved, components of the wheel end assembly may be damaged.

More particularly, the wheel end assembly typically includes a wheel hub that is rotatably mounted on a bearing assembly, which in turn is immovably mounted on the outboard end of the axle, commonly known as an axle spindle. The bearing assembly includes an inboard bearing and an outboard bearing, which may be separated by a bearing spacer. An axle spindle nut assembly secures the bearing assembly on the axle spindle by threadably engaging threads that are cut into the outer diameter of the outboard end of the axle spindle.

As is well known to those skilled in the art, for normal operation of the wheel end assembly to occur, the bearing assembly and surrounding components must be lubricated with grease or oil. Therefore, the wheel end assembly also must be sealed to prevent leakage of the lubricant, and also to prevent contaminants from entering the assembly, both of which could be detrimental to its performance. More specifically, a hubcap is mounted on an outboard end of the hub adjacent to and outboard from the axle spindle nut assembly, and a main seal is rotatably mounted on an inboard end of the hub in abutment with the axle spindle, resulting in a closed or sealed wheel end assembly.

In the event of a tire inflation system supply line or rotary union leak, there may be a relatively high build-up in air pressure inside the axle and/or wheel end assembly. Such an air pressure build-up may damage the wheel end assembly main seal. If the main seal becomes damaged, it may allow loss of the bearing lubricant, which in turn may undesirably reduce the life of the bearings and/or other components of the wheel end assembly.

In addition, relatively low air pressure build-ups may occur inside an axle and/or wheel end assembly of a heavy-duty vehicle that includes a tire inflation system, and of a heavy-duty vehicle that does not include a tire inflation system. Such low build-ups in air pressure may occur due to any one of multiple causes, such as an increase in ambient temperature, dynamic heating of the components of the wheel end assembly as the vehicle travels, changes in atmospheric pressure when the vehicle travels over roads with significant altitude changes, or a small leak in a supply line if a tire inflation system is employed. Even such a relatively low build-up in air pressure inside the axle and/or wheel end assembly may undesirably reduce the integrity and/or the life of the main seal, which in turn may undesirably reduce the life of the bearings and/or other components of the wheel end assembly.

As a result, it is often desirable to provide an axle and/or wheel end assembly with means for relieving such build-ups of air pressure by venting or exhausting air to atmosphere. Ideally, in order to prevent damage to the wheel end assembly main seal, such means would be capable of exhausting air at a low pressure, so low build-ups in air pressure in the axle and/or wheel end assembly that are due to increases in ambient temperature, dynamic heating of the wheel end assembly, and/or changes in atmospheric pressure remain less than one (1) pound per square inch (psi). In addition, to enable relief of high pressure build-ups to adequately vent the axle and/or wheel end assembly in the event of a tire inflation system supply line or rotary union leak and thus prevent damage to the wheel end assembly main seal, such means would also ideally be capable of high flow of at least about five (5) to ten (10) standard cubic feet per minute (scfm) at a pressure differential of about three (3) psi.

Moreover, when venting or exhausting an air pressure build-up to atmosphere from an axle and/or wheel end assembly, contaminants may be introduced into the wheel end assembly, which may undesirably reduce the life of the bearings and/or other components of the assembly. Therefore, it is also desirable to reduce or minimize the ability of contaminants to enter the wheel end assembly through any vent or exhaust.

In the prior art, certain tire inflation systems have incorporated venting devices in the hubcap to relieve excessive air pressure build-up. However, many of these hubcap venting devices lack the robustness to adequately prevent contaminants from entering the wheel end assembly, which may undesirably reduce the life of the bearings and/or other components of the assembly. More particularly, because these venting devices are incorporated into the hubcap, which is often in an exposed outboard location on the wheel end assembly, the venting devices also are in an exposed location. Such a location enables contaminants, such as water from a high-pressure truck wash, to breach such venting devices and enter the wheel end assembly, thereby reducing the life of the bearings and/or other components of the assembly. In addition, many of these prior art hubcap venting devices lack adequate flow to enable relief of high pressure build-ups in the axle and/or wheel end assembly in the event of a tire inflation system supply line or rotary union leak, thereby allowing the integrity of the wheel end assembly main seal to potentially be compromised.

Other known prior art axle vent devices include vent tubes for drive axles. Vent tubes are often utilized on drive axles because the gears inside the axle generate heat during operation, thus causing the air inside the axle to expand, creating a need to relieve excessive air pressure. Such vent tubes are installed on a drive axle by threading one end of a tube or hose into a corresponding opening formed in the axle. The tube hangs vertically from the axle, with the opposite end of the tube being open to atmosphere. Because the tube is open to atmosphere, such vent tubes typically are not effective in preventing contaminants, such as water, from entering the axle. For example, if a heavy-duty vehicle having such an axle vent tube is backed into a loading dock that is partially submerged in water, the tube may become submerged, which undesirably enables water to enter the axle.

Another known prior art axle vent device involves attaching one end of a rubber hose or tube to a top central portion of an axle, and fastening the hose to the vehicle frame in a manner that allows the hose to extend vertically upwardly from the axle, bend at its highest point, and then wrap back upon itself vertically downwardly. Alternatively, some types of these vent devices are free-standing, rather than being fastened to the vehicle frame, and the downwardly-extending portion of the hose is secured to the upwardly-extending portion by means such as a common tie wrap. However, the end of the hose which is opposite from the end that is attached to the axle is open, and therefore is not effective in preventing contaminants, such as water, from entering the axle. Such axle vent devices enable water to enter the axle if the hose becomes submerged when a heavy-duty vehicle backs into a partially-submerged loading dock.

Still another known prior art axle vent device, which is shown and described in U.S. Pat. No. 6,725,743, and which is owned by the same Assignee as the present invention, Hendrickson USA, L.L.C., involves a tube that is preformed into at least a single loop and is capable of substantially surrounding the axle. One end of the tube is connected to an opening formed in the axle, and the opposite end of the tube includes a check valve to prevent contaminants from entering the axle and wheel end assembly through the vent tube. However, the placement of the check valve on the end of the tube opposite the end that connects to the axle potentially exposes the check valve to undesirable damage from road debris, thereby possibly compromising the integrity of the check valve. If the integrity of the check valve is compromised, contaminants such as moisture may be able to enter the tube and thus impede or obstruct the vent path, particularly if the moisture freezes inside the tube. Also, if the integrity of the check valve is compromised, contaminants may be able to pass through the tube and enter the axle and/or wheel end assembly. Moreover, the preformed-loop tube may be difficult to install and/or adjust, as tightening or rotation of the fitting that provides the connection of the tube to the axle may impeded once the tube surrounds the axle.

Prior art means for relieving the build-up of air pressure in an axle and/or wheel end assembly also often lack the ability to equalize the pressure inside the axle to prevent a vacuum condition from forming inside of the axle and/or wheel end assembly. More particularly, if the means for relieving the build-up of air pressure is unable to allow air to flow from atmosphere into the axle, fluctuations in ambient temperature may create a vacuum condition inside the axle. Such a vacuum condition may undesirably shift the wheel end main seal from its overall position between the axle spindle and the wheel hub, and/or may shift the relative position of the components of the main seal, either of which may compromise the integrity of the main seal and/or reduce its life. It is also desirable to avoid creating a vacuum condition inside the axle and/or the wheel end assembly in order to reduce the possibility that contaminants may be drawn into the axle and/or wheel end assembly by the vacuum. Therefore, it is desirable that the means for relieving the build-up of air pressure also optionally enables the equalization of pressure inside the axle, thereby reducing or minimizing the creation of a vacuum condition inside the axle.

As a result, there is a need in the art for a vehicle axle vent system that relieves pressure build-up in the axle and/or the wheel end assembly and optionally enables the equalization of pressure inside the axle, while protecting the integrity of the check valve, reducing the ability of ice to obstruct the vent path, and preventing contaminants from entering the axle and wheel end assembly, thereby extending the life of the components of the wheel end assembly, and which is easy to install. The vehicle axle vent system of the present invention satisfies these needs, as will be described in detail below.

BRIEF SUMMARY OF THE INVENTION

An objective of the present invention is to provide a vehicle axle vent system that relieves pressure build-up in the axle and/or the wheel end assembly.

Another objective of the present invention is to provide a vehicle axle vent system that optionally enables the equalization of pressure inside the axle.

A further objective of the present invention is to provide a vehicle axle vent system that protects the integrity of the check valve, reduces the ability of ice to obstruct the vent path, and prevents contaminants from entering the axle and wheel end assembly.

Yet another objective of the present invention is to provide a vehicle axle vent system that extends the life of the components of the wheel end assembly.

Still another objective of the present invention is to provide a vehicle axle vent system that is easy to install.

These objectives and others are obtained by the vehicle axle vent system of the present invention. By way of example, the vent system includes a check valve. The check valve includes a first end that is mounted on an axle of the vehicle, a second end, and a body that is disposed between the first and second ends, and is in selective fluid communication with an interior of the axle. The vent system also includes a vertically-extending exhaust tube. The exhaust tube includes a first end that is mounted on the second end of the check valve, and a second end that is open to atmosphere and is in fluid communication with the check valve body. The vent system selectively exhausts air from the axle interior to atmosphere to relieve buildups of pneumatic pressure in the axle.

BRIEF DESCRIPTION OF THE SEVERAL VIEWS OF THE DRAWINGS

The preferred embodiments of the present invention, illustrative of the best modes in which Applicants have contemplated applying the principles, are set forth in the following description and are shown in the drawings, and are particularly and distinctly pointed out and set forth in the appended claims.

Similar numerals refer to similar parts throughout the drawings.

DETAILED DESCRIPTION OF THE INVENTION

Figure 1:
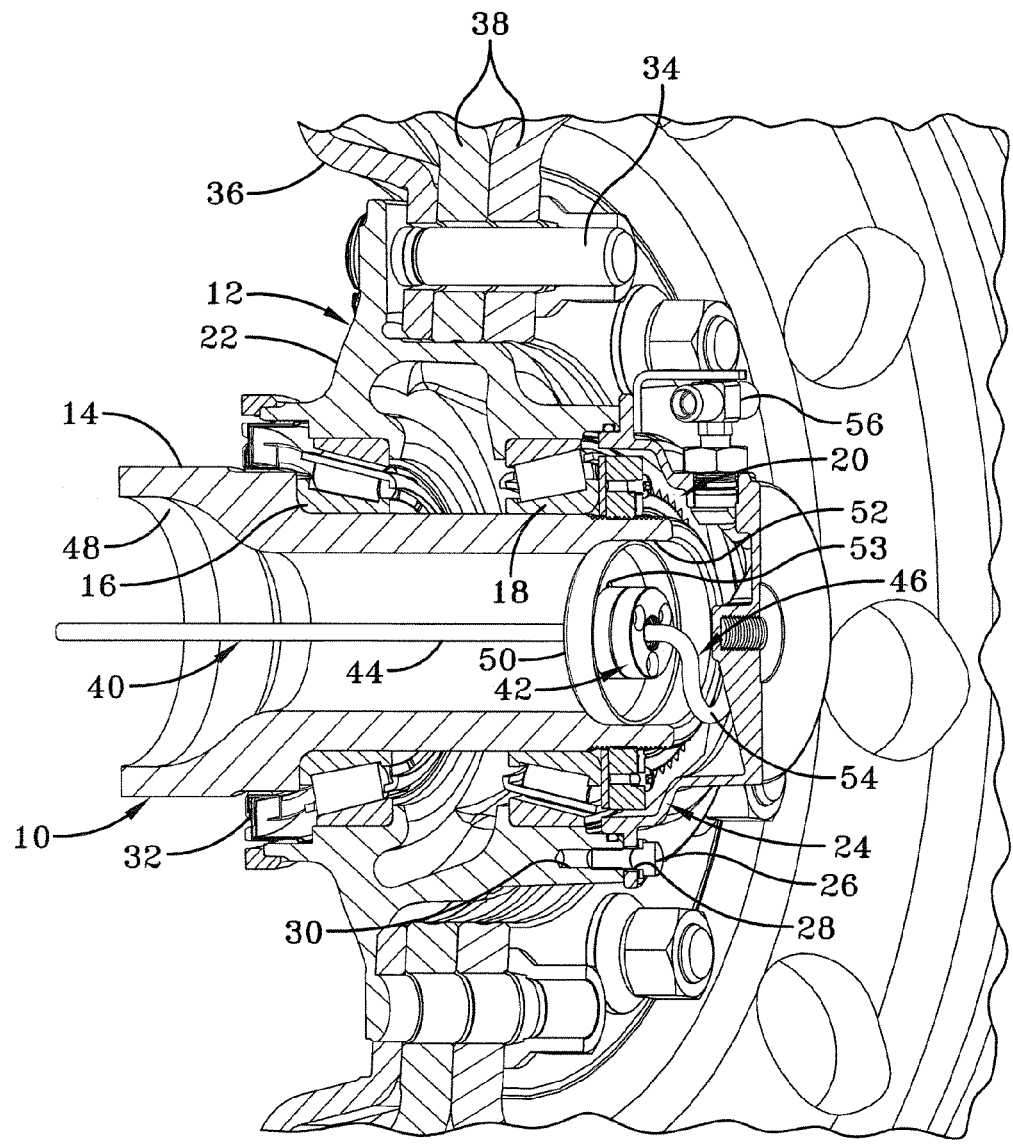
FIG. 1 is a fragmentary cross-sectional perspective view of a portion of an axle spindle and a wheel end assembly, having certain components of a tire inflation system mounted thereon, and a brake drum and tire rims mounted on the hub of the wheel end assembly.

In order to better understand the vehicle axle vent system of the present invention and the environment in which it operates, the components of an exemplary tire inflation system and the vehicle structures upon which they are mounted are shown in FIG. 1, and now will be described. As mentioned above, it is to be understood that the vehicle axle vent system of the present invention may be employed on heavy-duty vehicles that include tire inflation systems, and on heavy-duty vehicles that do not include tire inflation systems, and that reference herein is made to heavy-duty vehicles with tire inflation systems only by way of example.

One or more axles 10 typically depend from and extend transversely across a heavy-duty vehicle (not shown). Heavy-duty vehicles include trucks and tractor-trailers or semi-trailers, and the tractor-trailers or semi-trailers typically are equipped with one or more trailers. Reference herein shall be made generally to a heavy-duty vehicle for the purpose of convenience, with the understanding that such reference includes trucks, tractor-trailers and semi-trailers, and trailers thereof. Each axle 10 has two ends, with a wheel end assembly 12 mounted on each one of the ends. For the purposes of convenience and clarity, only one end of axle 10 and its respective wheel end assembly 12 will be described herein.

Axle 10 includes a central tube 13 (FIG. 2), and an axle spindle 14 is integrally connected, by any suitable means such as welding, to each end of the central tube. Wheel end assembly 12 includes a bearing assembly having an inboard bearing 16 and an outboard bearing 18 immovably mounted on the outboard end of axle spindle 14. A spindle nut assembly 20 threadably engages the outboard end of axle spindle 14 and secures bearings 16, 18 in place. A wheel hub 22 is rotatably mounted on inboard and outboard bearings 16, 18 in a manner well known to those skilled in the art.

A hub cap 24 is mounted on the outboard end of hub 22 by a plurality of bolts 26, each one of which passes through a respective one of a plurality of openings 28 formed in the hub cap, and threadably engages a respective one of a plurality of aligned threaded openings 30 formed in the hub. In this manner, hub cap 24 closes the outboard end of wheel end assembly 12. A main continuous seal 32 is rotatably mounted on the inboard end of wheel end assembly 12 and closes the inboard end of the assembly. In a typical heavy-duty vehicle dual-wheel configuration, a plurality of threaded bolts 34 are used to mount a brake drum 36 and a pair of tire rims 38 on wheel end assembly 12. Each one of a pair of tires (not shown) is mounted on a respective one of tire rims 38, as known in the art.

An exemplary tire inflation system of the prior art is indicated generally at 40. A central bore 48 is formed in axle 10, through which a pneumatic conduit 44 of tire inflation system 40 extends toward an outboard end of axle spindle 14. Pneumatic conduit 44 is fluidly connected to and extends between the vehicle air supply, such as an air tank (not shown), and a rotary union 42. Rotary union 42 is attached to a plug 50 that is press-fit in a machined counterbore 52 formed in axle central bore 48 at an outboard end of axle spindle 14, and as known in the art, facilitates the connection of static pneumatic conduit 44 to an air tube assembly 46, which rotates with the tire. Plug 50 is formed with an opening 53, which is known in the art as a breather hole, and allows fluid communication between axle central bore 48 and wheel end assembly 12.

Air tube assembly 46 includes a first tube 54 that is fluidly connected at one of its ends to rotary union 42 inside hub cap 24, and is fluidly connected at the other of its ends to a tee fitting 56, which passes through the hub cap and is secured to the hub cap. Additional air tubes (not shown) are fluidly connected to and extend from each one of two outlets of tee fitting 56 outside of hub cap 24 to each one of a respective pair of tires mounted on rims 38. In this manner, air passes from the vehicle air tank, through pneumatic conduit 44, rotary union 42, first air tube 54, hub cap 24 and tee fitting 56, and into the tires.

Should pneumatic conduit 44 of tire inflation system 40 experience a leak or rupture, or should rotary union 42 experience a leak, there may be a relatively high build-up of air pressure in axle 10 and/or wheel end assembly 12. If the pressure build-up remains unrelieved, main seal 32 may be damaged, which in turn may allow the loss of the bearing lubricant, thereby undesirably reducing the life of bearings 16, 18 and/or other components of wheel end assembly 12. To enable relief of high pressure build-ups to adequately vent axle 10 and/or wheel end assembly 12, it is desirable to provide means for venting or exhausting air to atmosphere at a high flow of at least about five (5) to ten (10) standard cubic feet per minute (scfm), at a pressure differential of about three (3) psi.

In addition, increases in ambient temperature, dynamic heating of wheel end assembly 12, and changes in atmospheric pressure may cause relatively low air pressure build-ups to occur inside axle 10 and/or wheel end assembly 12, whether or not tire inflation system 40 is employed on the vehicle. Even such relatively low build-ups in air pressure inside axle 10 and/or wheel end assembly 12 may undesirably reduce the integrity and/or the life of main seal 32, which in turn may undesirably reduce the life of bearings 16, 18 and/or other components of wheel end assembly 12. To relieve such low pressure build-ups, it is desirable to provide means for exhausting air from axle 10 and/or wheel end assembly 12 at a low pressure, so low build-ups in air pressure remain less than one (1) pound per square inch (psi).

As a result, it is often desirable to provide a vent device that relieves the build-up of air pressure in axle 10 and/or wheel end assembly 12 by venting or exhausting it to atmosphere. However, contaminants may be introduced into wheel end assembly 12 as a result of the use of such a vent device, and may undesirably reduce the life of bearings 16, 18 and/or other components of the wheel end assembly. Therefore, it is desirable for such a vent device to reduce or minimize the ability of contaminants to enter wheel end assembly 12.

Figure 2:
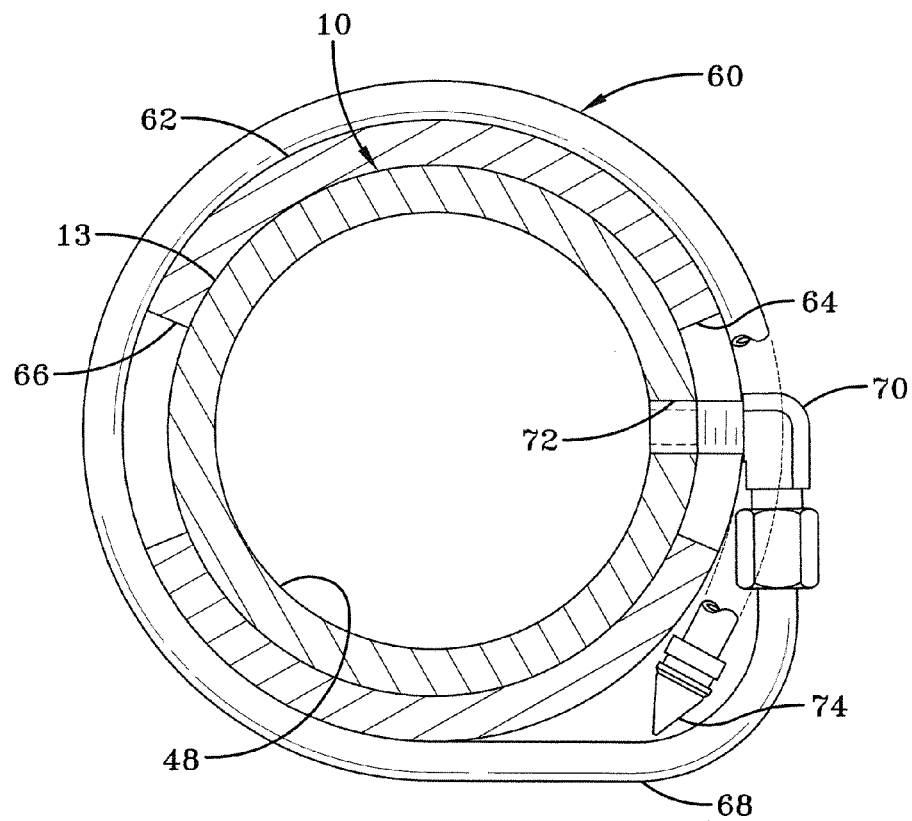
FIG. 2 is a fragmentary cross-sectional view of a prior art axle vent device shown operatively attached to a heavy-duty vehicle axle, with hidden parts represented by broken lines.

An exemplary prior art axle vent device is indicated generally at 60 and is shown in FIG. 2. As shown in FIG. 2, axle 10 optionally extends through and is welded to an axle wrap or sleeve 62, preferably using continuous welds (not shown) at rear and front windows 64 and 66, respectively, formed in the sleeve. Prior art vent device 60 includes a tube 68 that is preformed or coiled into at least a single loop that is sufficient to substantially surround axle sleeve 62. The inside diameter of the coil of tube 68 preferably is slightly smaller than the outside diameter of axle sleeve 62, so that when stretched about the axle sleeve, the tube grips the sleeve.

A first end of tube 68 has a threaded fitting 70 attached thereto, which in turn is disposed in a complementary-sized and shaped threaded opening 72 formed in axle 10 at a location within first axle sleeve window 64. Fitting 70 fluidly communicates with axle hollow interior or bore 48 and with tube 68. A second end of tube 68 preferably is fitted with a duck bill-type one-way check valve 74, which fluidly communicates with the tube. The fluid communication of tube 68 with axle 10 enables prior art axle vent device 60 to relieve the build-up of air pressure in the axle and/or wheel end assembly 12 by venting or exhausting excess air pressure to atmosphere. In addition, check valve 74 disposed on the second end of tube 68 allows air to exhaust from axle 10, while generally preventing contaminants from entering the axle and wheel end assembly 12.

However, the placement of check valve 74 on the second end of tube 68 potentially exposes the check valve to undesirable damage from road debris, thereby possibly compromising the integrity of the check valve. In the event that the integrity of check valve 74 is compromised, contaminants such as moisture may be able to enter tube 68 and thus impede or obstruct the vent path, particularly if the moisture freezes inside the tube. Also, if the integrity of check valve 74 is compromised, contaminants may be able to pass through tube 68 and enter axle 10 and/or wheel end assembly 12. Moreover, because tube 68 includes a preformed coil or loop, it may be difficult to install and/or adjust axle vent device 60, as tightening or rotation of fitting 70 may be impeded once the tube surrounds axle 10.

As a result, there is a need in the art for a vehicle axle vent system that relieves pressure build-up in axle 10 and/or wheel end assembly 12 and optionally enables the equalization of pressure inside the axle, while preventing contaminants from entering the axle and wheel end assembly, reducing the ability of ice to obstruct the vent path, and protecting the integrity of a check valve, thereby extending the life of the components of the wheel end assembly, and which is easy to install. The vehicle axle vent system of the present invention satisfies these needs, as now will be described.

Figure 3:
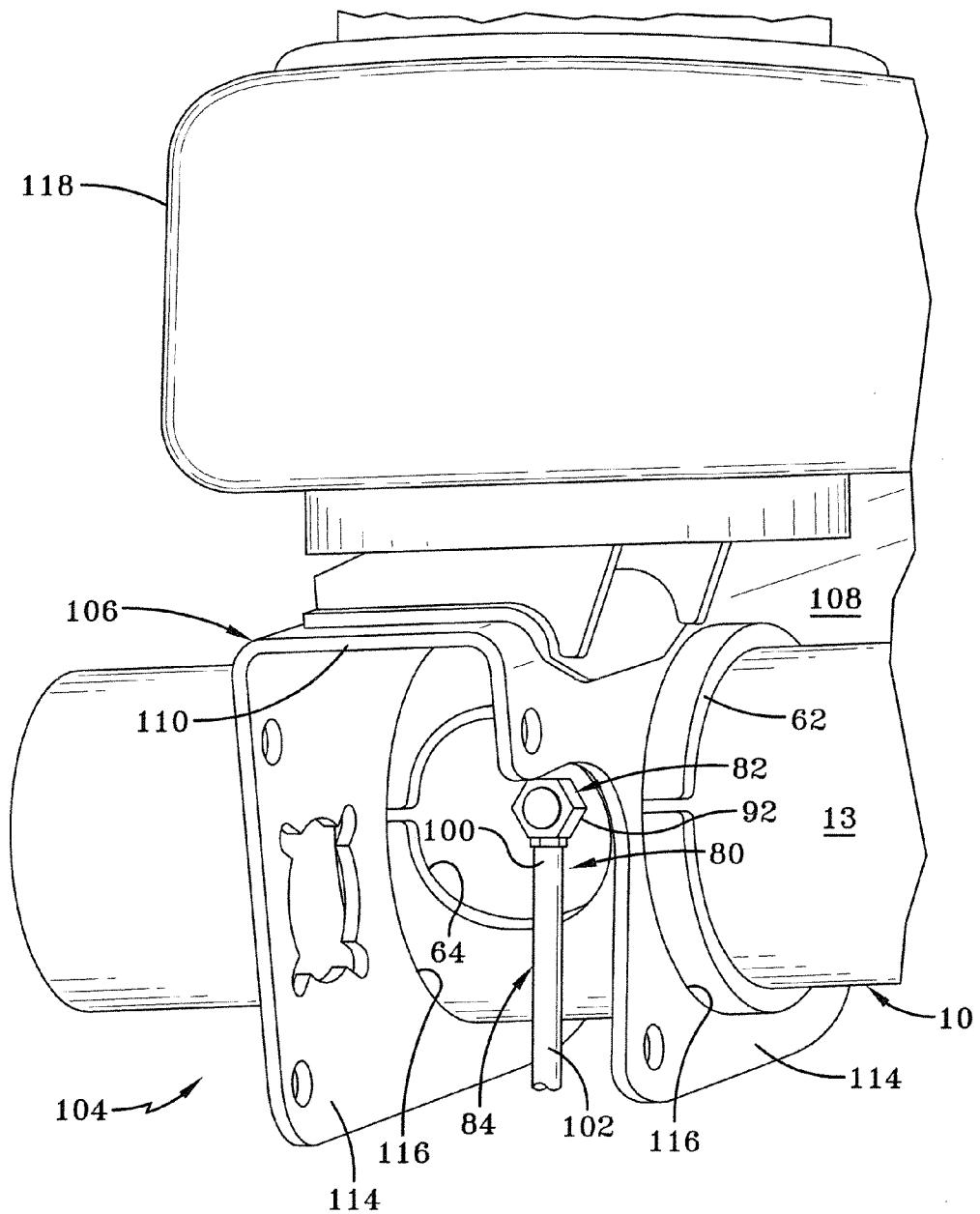
FIG. 3 is fragmentary rear perspective view of an exemplary embodiment of the vehicle axle vent system of the present invention shown operatively attached to a heavy-duty vehicle axle and showing associated components of a suspension assembly.

The vehicle axle vent system of the present invention is indicated generally at 80 and is shown in FIG. 3. Vent system 80 includes a one-way check valve 82 that is mounted directly on axle 10, and a vertically downwardly-extending flexible tube 84 that is fluidly connected to the check valve. More particularly, with additional reference to FIG. 4, check valve 82 includes a valve body 86 that will be described in greater detail below, a threaded shoulder 88, and a hose barb 90. To engage axle 10, a threaded opening 92 is formed in the wall of the axle, and shoulder 88 is formed with threads 94 that engage the threads of the axle wall opening. A distal end 96 of shoulder 88 extends into axle bore 48 (FIG. 1). Shoulder 88 and hose barb 90 are each formed with respective central bores 120, 122, creating a fluid path that extends through check valve 82, thereby enabling sealed fluid communication between axle bore 48 and the check valve. This fluid communication is controlled by valve body 86, as will be described below.

With continuing reference to FIG. 3, check valve 82 preferably is mounted on axle 10 at rear window 64 in axle sleeve 62. More particularly, most heavy-duty vehicles have an axle/suspension system 104, in which axle 10 extends between and is captured in a pair of spaced-apart suspension assemblies 106, only one of which is shown. Suspension assemblies 106 may be of the leading arm beam-type, the trailing arm beam-type, or the spring beam-type. For the purpose of convenience, suspension assembly 106 is shown and described herein as a trailing arm beam-type.

In suspension assembly 106, a hanger (not shown) is securely mounted on and depends from the vehicle frame (not shown). The front end of a trailing beam 108 includes a bushing assembly (not shown) which is pivotally mounted on the hanger in a well-known manner. An air spring 118 is mounted on the rear end of beam 108. Beam 108 typically is a robust steel box-like structure having a top wall 110, and optionally a bottom wall (not shown), and a pair of spaced-apart sidewalls 114 which interconnect the top wall and any bottom wall to form the generally rectangular-shaped hollow box beam structure. Axle sleeve 62 extends through and is welded to a pair of complementary-sized and shaped openings 116 formed in beam sidewalls 114 and extends outwardly a short distance from each of the sidewalls. Axle 10 extends through and is welded to sleeve 62, preferably using continuous welds (not shown) at first and second windows 64 and 66 (FIG. 2).

The preferred mounting location of check valve 82 on axle 10 within rear window 64 of axle sleeve 62 enables vent system 80 to be disposed within beam 108, which protects the system from road debris during operation of the vehicle, thereby reducing or minimizing potential damage to the system. The reduction or minimization of potential damage to vent system 80 is achieved by the location of the system without the need for undesirable add-on structures, such as guards or shields, thereby desirably reducing the cost and weight of the system.

Moreover, the preferred mounting location of check valve 82 within rear window 64 of axle sleeve 62 is a low-stress area of axle 10, which is favorable for forming axle opening 92. More particularly, it is generally preferred in the art to form an opening at a low-stress area than at a high-stress area, as an opening in a low-stress area tends to reduce the possibility that the opening will weaken axle 10 when compared to forming an opening in a high-stress area. Because the portion of axle 10 that is located within rear window 64 of axle sleeve 62 tends to experience lower stresses than certain other portions of the axle, forming opening 92 to receive check valve shoulder 88 in this location reduces potential weakening of the axle. Of course, depending on particular design considerations, check valve 82 may be mounted directly on axle 10 in other locations, such as within front window 66 of axle sleeve 62, which is also a low-stress area, or on other portions of the axle.

Figure 4:
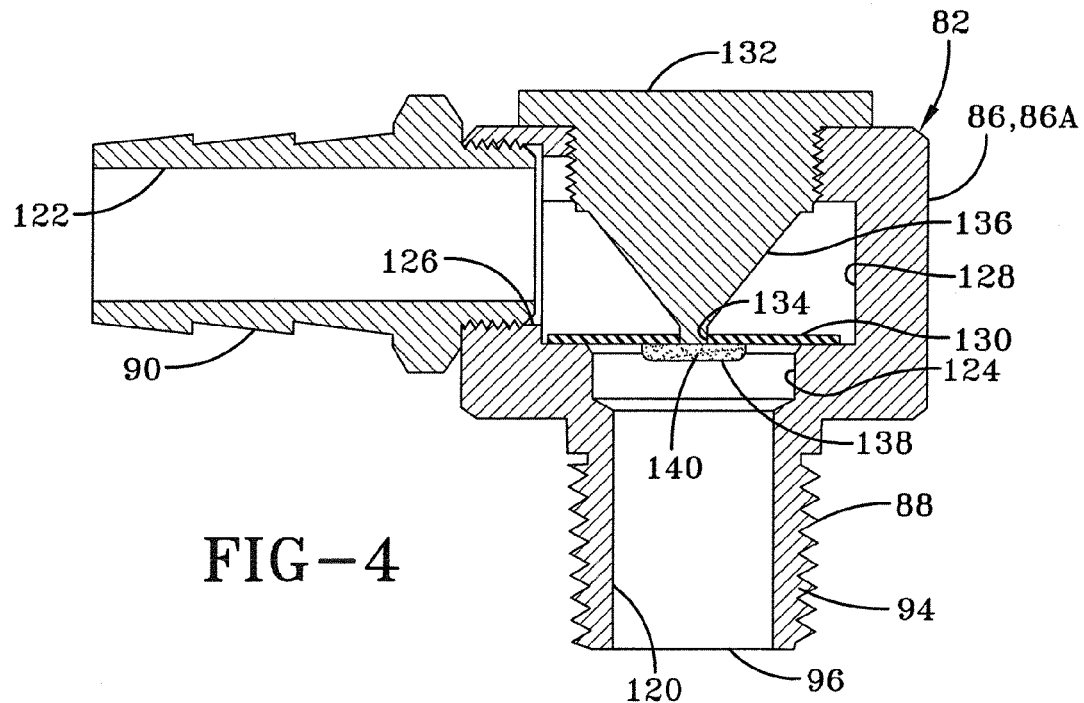
FIG. 4 is an enlarged cross-sectional view of a first exemplary check valve for use in the vehicle axle vent system shown in FIG. 3.

Turning now to FIG. 4, a first exemplary valve body 86A of check valve 82 of vehicle axle vent system 80 is shown. Shoulder 88 is integrally formed with or is mechanically connected to valve body 86A, and the valve body includes an inlet 124 that is fluidly connected to shoulder bore 120. Hose barb 90 is also integrally formed with or is mechanically connected to valve body 86A, and the valve body includes an outlet 126 that is fluidly connected to hose barb bore 122. A valve chamber 128 is formed between and is fluidly connected to valve body inlet 124 and valve body outlet 126. A flat rubber diaphragm 130 and a retention pin 132 are disposed in valve chamber 128. More particularly, retention pin 132 extends through an opening 134 formed in diaphragm 130 and includes a cone-shaped portion 136 on one side of the diaphragm and a flat portion 138 on the other side of the diaphragm, which cooperate to retain the position of the diaphragm across valve chamber 128.

With this construction of first exemplary valve body 86A, when there is an increase in pressure inside axle 10 (FIG. 3) and/or wheel end assembly 12 (FIG. 1) above atmospheric pressure, air flows through bore 120 in shoulder 88, causing diaphragm 130 to flex toward cone portion 136 of retention pin 132. When diaphragm 130 flexes toward cone portion 136, air flows past the diaphragm through valve chamber 128 to hose barb bore 122, and out to atmosphere through tube 84 (FIG. 3), thereby relieving excess pressure inside axle 10 and/or wheel end assembly 12.

In order to maximize the life of main seal 32, it is desirable to maintain the pressure in axle bore 48 as close as possible to atmospheric pressure, which is also known as maintaining a pressure differential that is as close as possible to zero (0) pounds per square inch (psi). In most cases, it is preferable to maintain a pressure differential in axle bore 48 that is less than about three (3) to five (5) psi, and is more preferable to maintain a pressure differential that is about one (1) psi or less, depending on the specific construction of main seal 32. To maintain such a low pressure differential, diaphragm 130 flexes toward cone portion 136 of retention pin 132 and thus opens upon a pressure increase inside axle 10 that is preferably less than about one (1) psi. This is referred to as valve 82 having a preferred crack pressure of less than about one (1) psi. Such a low crack pressure enables check valve 82 to relieve low pressure increases that may unduly stress wheel end assembly main seal 32, such as those caused by an increase in ambient temperature, by dynamic heating of wheel end assembly 12, or by changes in atmospheric pressure.

In addition, the configuration of diaphragm 130 and cone-shaped portion 136 of retention pin 132 enables a high volume of air flow through valve chamber 128, thereby quickly and efficiently venting or exhausting pressure in axle 10 and/or wheel end assembly 12 in the event of a high pressure increase, such as a leak in pneumatic conduit 44 (FIG. 1) or rotary union 42 when tire inflation system 40 is employed. Valve body 86A enables high air flow venting, preferably including a flow rate of at least about five (5) to ten (10) scfm, and more preferably between about eight (8) and eight point five (8.5) scfm, when the pressure differential is about three (3) psi or less. Of course, the flow rate of valve body 86A will be different for other pressure differentials.

In the event that water or other contaminants enter valve body 86A through hose barb bore 122, diaphragm 130 cooperates with flat portion 138 of retention pin 132 to firmly seat in and thus seal valve chamber 128. When diaphragm 130 seats in valve chamber 128, water and/or other contaminants are prevented from ingressing through shoulder bore 120 and into axle 10 and/or wheel end assembly 12.

Retention pin 132 preferably also includes a porous material portion 140 to prevent a vacuum condition from forming inside of axle 10 and/or wheel end assembly 12. More particularly, if diaphragm 130 is unable to allow air to pass from hose barb bore 122 to shoulder bore 120, fluctuations in ambient temperature may create a vacuum condition inside axle bore 48. Such a vacuum condition may undesirably shift wheel end main seal 32 from its overall position between axle spindle 14 and wheel hub 22 (FIG. 1), and/or may shift the relative position of the components of the main seal, either of which may compromise the integrity of the main seal and/or reduce its life. In addition, it is desirable to avoid creating a vacuum condition inside axle 10 and/or wheel end assembly 12 that may cause water or other contaminants to be drawn through tube 84 and into valve body 86A, which increases the possibility of contamination of the axle and/or wheel end assembly. Porous material portion 140 of retention pin 132 allows air to flow from hose barb bore 122 to shoulder bore 120, while preventing or blocking the flow of water and/or other contaminants. Porous material portion 140 thus enables equalization of pressure, which reduces or minimizes the creation of a vacuum condition inside axle bore 48, and in turn maximizes the integrity and life of main seal 32 and avoids the drawing of water and/or other contaminants through tube 84 and into valve body 86A.

With additional reference now to FIG. 3, a first end 100 of vertically-extending tube 84 engages hose barb 90 as known in the art, and optionally includes a hose clamp (not shown) to secure the tube to the hose barb. A second end 102 of tube 84 is open to atmosphere. Tube 84 preferably is formed of a flexible or semi-flexible material, such as vinyl or other polymers, an elastomer, or a combination thereof, and may optionally be reinforced with metal or polymer braiding as known in the art. In addition, tube 84 preferably includes an outside diameter of about one-half (½) of an inch, and a length of from about four (4) to about six (6) inches. In this manner, excess air pressure inside axle 10 and/or wheel end assembly 12 passes from axle bore 48 through valve shoulder 88, valve body 86A, hose barb 90 and tube 84, and is exhausted to atmosphere.

Tube 84 preferably is vertically downwardly-extending, which enables any moisture and/or other contaminants in the tube to readily drain out and away from check valve 82. The downwardly-extending orientation of tube 84 thus minimizes the retention of moisture or other contaminants in the tube, which in turn reduces the probability of contaminants remaining near check valve 82, and also reduces the possibility of moisture or other contaminants freezing in and thus obstructing the tube. In addition, the downwardly-extending orientation of tube 84 and the flexible nature of the tube enable vibration caused by over-the-road travel of the vehicle to dislodge ice that may have formed in the tube, thereby reducing the ability of ice to obstruct the vent path.

In addition, by mounting vertical tube 84 on check valve 82, the tube provides a controlled exhaust path that also reduces the amount of road spray and other contaminants that reach the flow path of the check valve. The mounting of check valve 82 on axle 10, combined with the mounting of tube 84 on the check valve, acts to preserve the integrity of the check valve by protecting the check valve from road debris and build-up of contaminants on valve outlet 126. This protection of check valve 82 enables continued functioning of the valve, which in turn prevents contaminants from entering axle 10 and/or wheel end assembly 12.

Moreover, because tube 84 preferably is flexible and of a relatively short length, from about four (4) inches to about six (6) inches, check valve 82 may be rotated in axle opening 92 while the tube is on the valve. Such a construction enables convenient and easy installation and/or adjustment of vehicle axle vent system 80, as well as installation of the system on axle 10 in a confined and thus desirably protected space.

Turning now to FIGS. 5-13, check valve 82 may include types of valve bodies 86 other than valve body 86A having diaphragm 130 and retention pin 132 (FIG. 4), thereby enabling different configurations based on design considerations.

Figure 5:
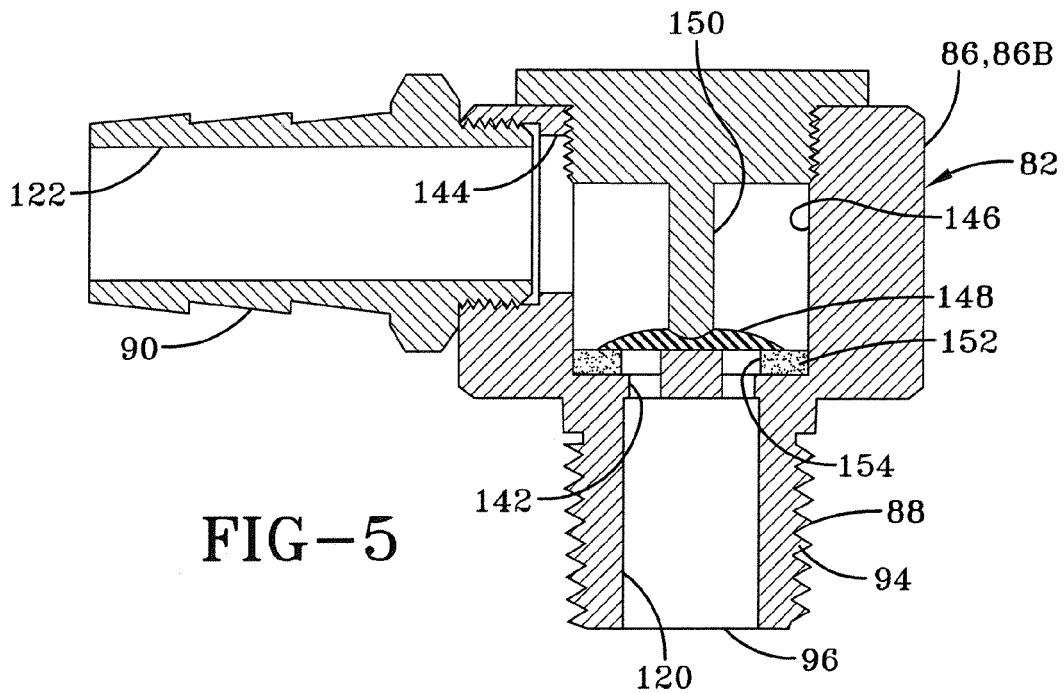
FIG. 5 is an enlarged cross-sectional view of a second exemplary check valve for use in the vehicle axle vent system shown in FIG. 3.

With reference to FIG. 5, a second exemplary valve body 86B is shown. Shoulder 88 is integrally formed with or is mechanically connected to valve body 86B, and the valve body includes an inlet 142 that is fluidly connected to shoulder bore 120. Hose barb 90 is also integrally formed with or is mechanically connected to valve body 86B, and the valve body includes an outlet 144 that is fluidly connected to hose barb bore 122. A valve chamber 146 is formed between and is fluidly connected to valve body inlet 142 and valve body outlet 144. A rubber diaphragm 148 is disposed in valve chamber 146 and is connected to a pin 150, which urges the diaphragm against a porous seat 152 that is formed with an opening 154. When there is an increase in pressure inside axle 10 (FIG. 3) and/or wheel end assembly 12 (FIG. 1) above atmospheric pressure, air flows through bore 120 in shoulder 88, causing diaphragm 148 to flex toward pin 150. The air flows through seat opening 154, past diaphragm 148, through valve chamber 146 to hose barb bore 122, and out to atmosphere through tube 84 (FIG. 3), thereby relieving excess pressure inside axle 10 and/or wheel end assembly 12.

To maintain a preferred pressure differential of less than about three (3) to five (5) psi, and a more preferred pressure differential of about one (1) psi, diaphragm 148 is capable of flexing toward pin 150 and thus opening at a preferred crack pressure of less than about one (1) psi. Opening at such a low crack pressure enables check valve 82 to relieve low pressure increases that may unduly stress wheel end assembly main seal 32 (FIG. 1), such as those caused by an increase in ambient temperature, by dynamic heating of wheel end assembly 12, or by changes in atmospheric pressure.

In addition, the configuration of diaphragm 148 on seat 152 enables a high volume of air flow through valve chamber 146, thereby quickly and efficiently venting or exhausting pressure in axle 10 and/or wheel end assembly 12 in the event of a high pressure increase, such as a leak in pneumatic conduit 44 (FIG. 1) or rotary union 42 when tire inflation system 40 is employed. Valve body 86B enables high air flow venting, preferably including a flow rate of at least about five (5) to ten (10) scfm, and more preferably between about eight (8) and eight point five (8.5) scfm, when the pressure differential is about three (3) psi or less. Of course, the flow rate of valve body 86B will be different for other pressure differentials.

In the event that water or other contaminants enter valve body 86B through hose barb bore 122, the urging of diaphragm 148 by pin 150 causes the diaphragm to engage seat 152 and thus seal valve chamber 146, thereby preventing water and/or other contaminants from ingressing through shoulder bore 120 into axle 10 and/or wheel end assembly 12.

Seat 152 preferably is formed from a porous material to enable equalization of pressure between atmosphere and axle bore 48. Such equalization reduces or minimizes the creation of a vacuum condition inside axle bore 48, which in turn maximizes the integrity and life of main seal 32 and avoids the drawing of water and/or other contaminants through tube 84 and into valve body 86B.

Figure 6:
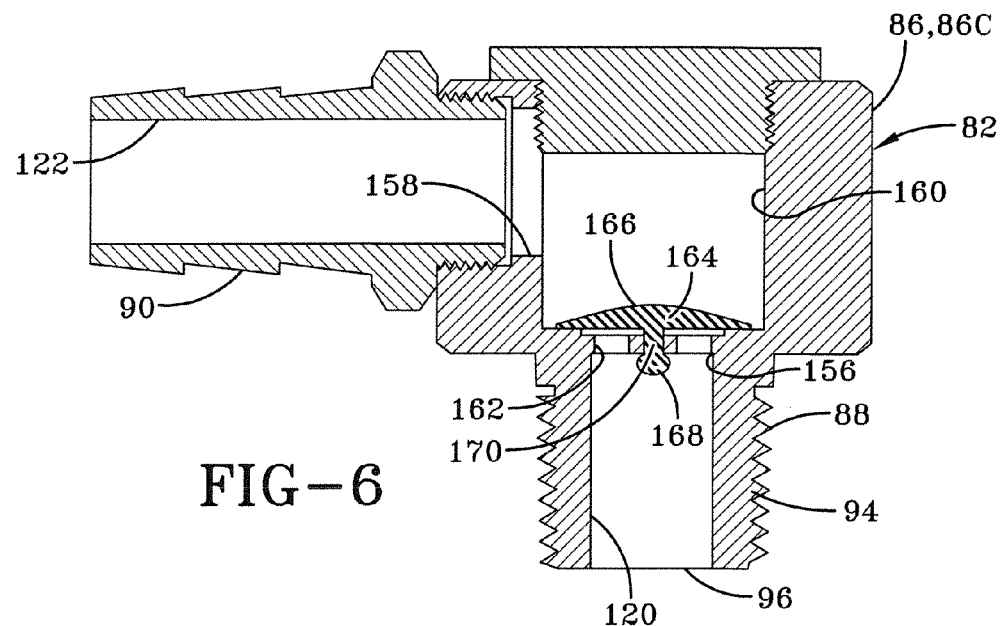
FIG. 6 is an enlarged cross-sectional view of a third exemplary check valve for use in the vehicle axle vent system shown in FIG. 3.

Turning to FIG. 6, a third exemplary valve body 86C is shown. Shoulder 88 is integrally formed with or is mechanically connected to valve body 86C, and the valve body includes an inlet 156 that is fluidly connected to shoulder bore 120. Hose barb 90 is also integrally formed with or is mechanically connected to valve body 86C, and the valve body includes an outlet 158 that is fluidly connected to hose barb bore 122. A valve chamber 160 is formed between and is fluidly connected to valve body inlet 156 and valve body outlet 158. An inlet orifice 162 is formed between inlet 156 and valve chamber 160. An upper portion 164 of an umbrella 166 is disposed in valve chamber 160 and seals inlet orifice 162, while a ball-shaped lower portion 168 of the umbrella is disposed below inlet 156 to retain the umbrella upper portion in a general position near the inlet orifice. A neck 170 extends between umbrella upper portion 164 and umbrella lower portion 168 through inlet orifice 162. When there is an increase in pressure inside axle 10 (FIG. 3) and/or wheel end assembly 12 (FIG. 1) above atmospheric pressure, air flows through bore 120 in shoulder 88, causing umbrella upper portion 164 to move away from inlet orifice 162, while lower umbrella portion 168 retains the upper umbrella portion near the inlet orifice. The air flows through inlet orifice 162, past umbrella upper portion 164, through valve chamber 160 to hose barb bore 122, and out to atmosphere through tube 84 (FIG. 3), thereby relieving excess pressure inside axle 10 and/or wheel end assembly 12.

To maintain a preferred pressure differential of less than about three (3) to five (5) psi, and a more preferred pressure differential of about one (1) psi, umbrella 166 is capable of opening at a preferred crack pressure of less than about one (1) psi. Opening at such a low crack pressure enables check valve 82 to relieve low pressure increases that may unduly stress wheel end assembly main seal 32 (FIG. 1), such as those caused by an increase in ambient temperature, by dynamic heating of wheel end assembly 12, or by changes in atmospheric pressure.

In addition, the configuration of umbrella 166 and inlet orifice 162 enables a high volume of air flow through valve chamber 160, thereby quickly and efficiently venting or exhausting pressure in axle 10 and/or wheel end assembly 12 in the event of a high pressure increase, such as a leak in pneumatic conduit 44 (FIG. 1) or rotary union 42 when tire inflation system 40 is employed. Valve body 86C enables high air flow venting, preferably including a flow rate of at least about five (5) to ten (10) scfm, and more preferably between about eight (8) and eight point five (8.5) scfm, when the pressure differential is about three (3) psi or less. Of course, the flow rate of valve body 86C will be different for other pressure differentials.

In the event that water or other contaminants enter valve body 86C through hose barb bore 122, umbrella 166 covers inlet orifice 162 to seal valve chamber 160, thereby preventing water and/or other contaminants from ingressing through shoulder bore 120 into axle 10 and/or wheel end assembly 12.

Figure 7:
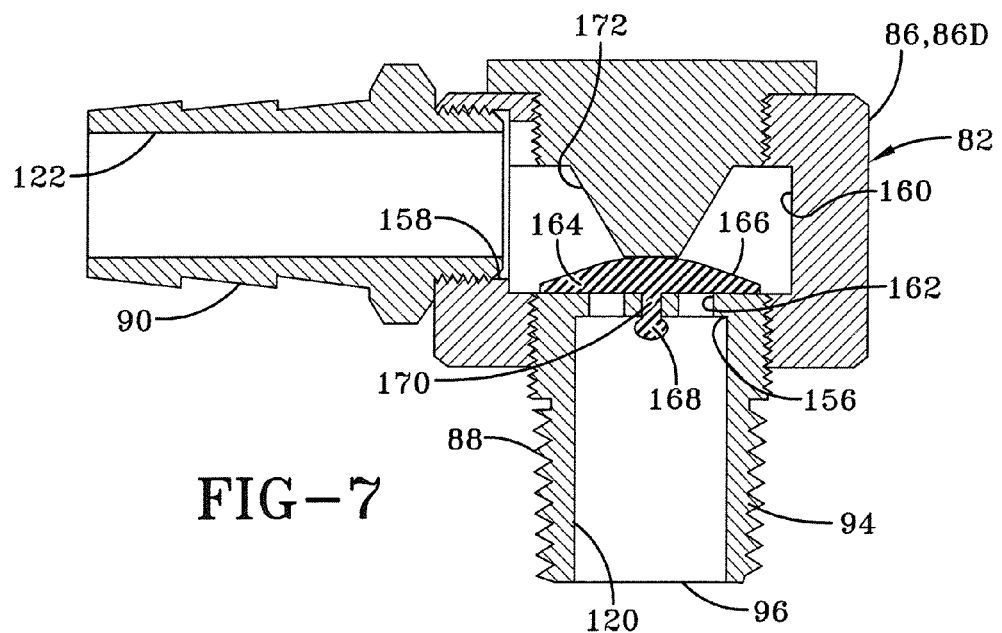
FIG. 7 is an enlarged cross-sectional view of a fourth exemplary check valve for use in the vehicle axle vent system shown in FIG. 3.

With reference now to FIG. 7, a fourth exemplary valve body 86D is shown. Valve body 86D is similar in construction and operation to third exemplary valve body 86C (FIG. 6), with the exception that the fourth exemplary valve body includes a mechanical retention pin 172 to provide additional mechanical force to retain the position of umbrella upper portion 164 over inlet orifice 162.

Figure 8:
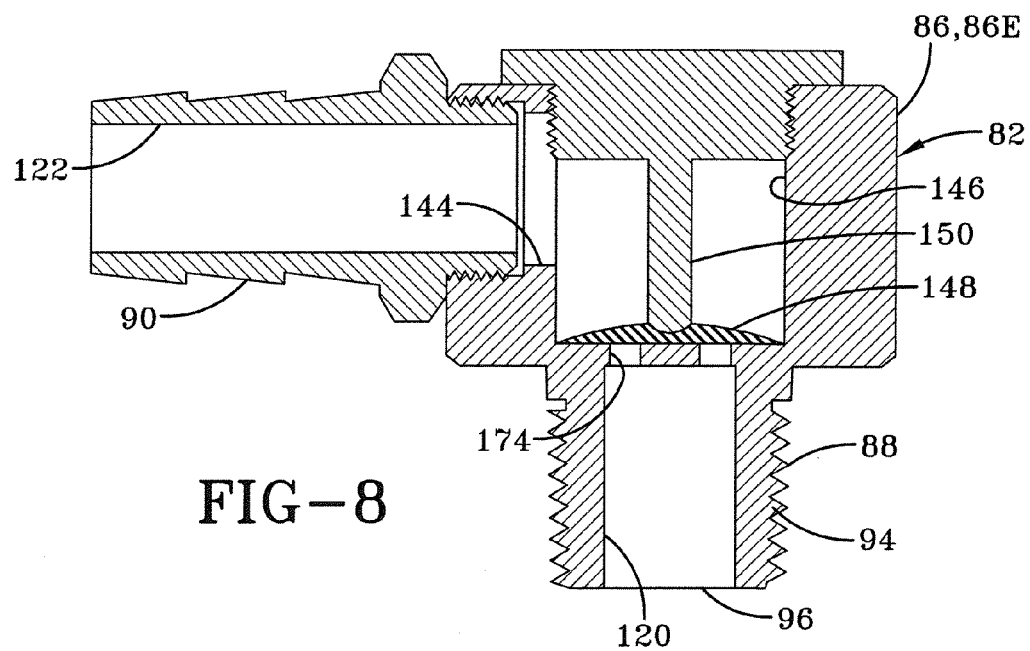
FIG. 8 is an enlarged cross-sectional view of a fifth exemplary check valve for use in the vehicle axle vent system shown in FIG. 3.

Turning now to FIG. 8, a fifth exemplary valve body 86E is shown. Valve body 86E is similar in construction and operation to second exemplary valve body 86B (FIG. 5), with the exception that the fifth exemplary valve body does not include seat 152 of porous material. Rather, diaphragm 148 seats directly against the wall of valve chamber 146 to cover an inlet orifice 174 and seal the valve chamber.

Figure 9:
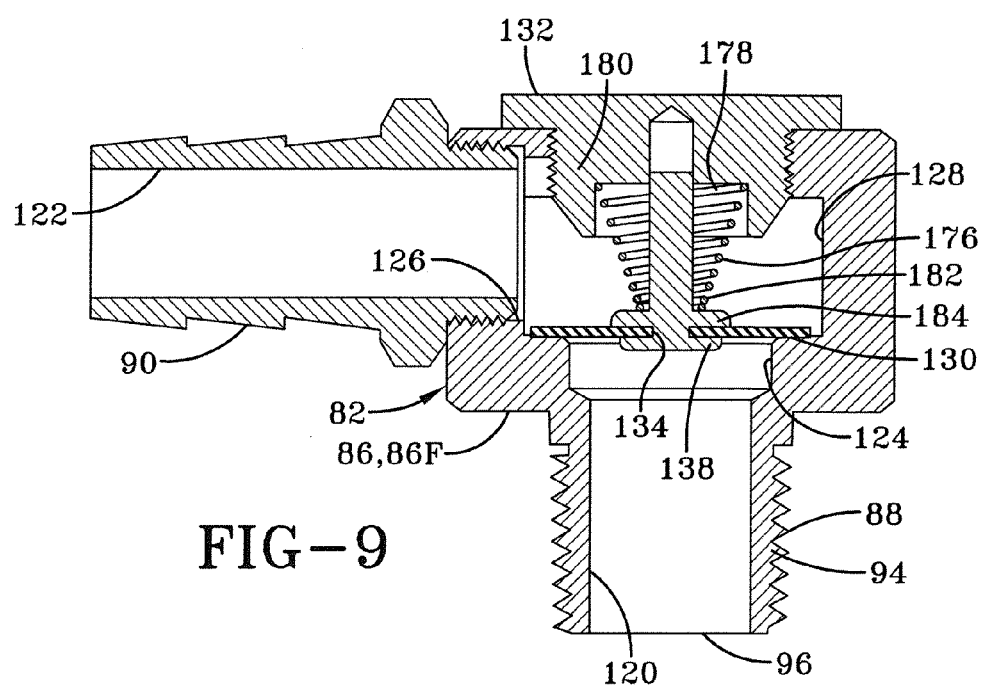
FIG. 9 is an enlarged cross-sectional view of a sixth exemplary check valve for use in the vehicle axle vent system shown in FIG. 3.

With reference now to FIG. 9, a sixth exemplary valve body 86F is shown. Valve body 86F is similar in construction and operation to first exemplary valve body 86A (FIG. 4), with the exception that the sixth exemplary valve body includes a spring 176 integrated into or with retention pin 132. More particularly, spring 176 preferably is a conical spring that seats on its broad end 178 against an upper housing 180 of retention pin 132, and on its narrow end 182 against a base 184 of the retention pin. The use of spring 176, the stiffness of which can be selected based upon particular design consideration, enables a specific load force to be exerted on diaphragm 130.

When low air flow from axle bore 48 (FIG. 1) is required, such as when there is an increase in ambient temperature, when there is dynamic heating of wheel end assembly 12 (FIG. 1), or when there is a change in atmospheric pressure, valve body 86F opens at a low crack pressure. For example, in order to maintain a preferred pressure differential of less than about three (3) to five (5) psi, and a more preferred pressure differential of about one (1) psi or less, diaphragm 130 flexes about pin 132 and spring 176 at a preferred crack pressure of less than about one (1) psi. The opening of valve body 86F at such a low crack pressure enables a low volume of air to flow through valve chamber 128 in order to maximize the life of main seal 32.

When high air flow from axle bore 48 is required, such as in the event of a leak in pneumatic conduit 44 or rotary union 42 when tire inflation system 40 is employed, the force of the higher volume of air overcomes the bias of spring 176 and moves diaphragm 130 toward upper housing 180 to enable the high volume of air to flow through valve chamber 128. Valve body 86F enables high air flow venting, preferably including a flow rate of at least about five (5) to ten (10) scfm, and more preferably between about eight (8) and eight point five (8.5) scfm, when the pressure differential is about three (3) psi or less. Of course, the flow rate of valve body 86F will be different for other pressure differentials.

Figure 10:
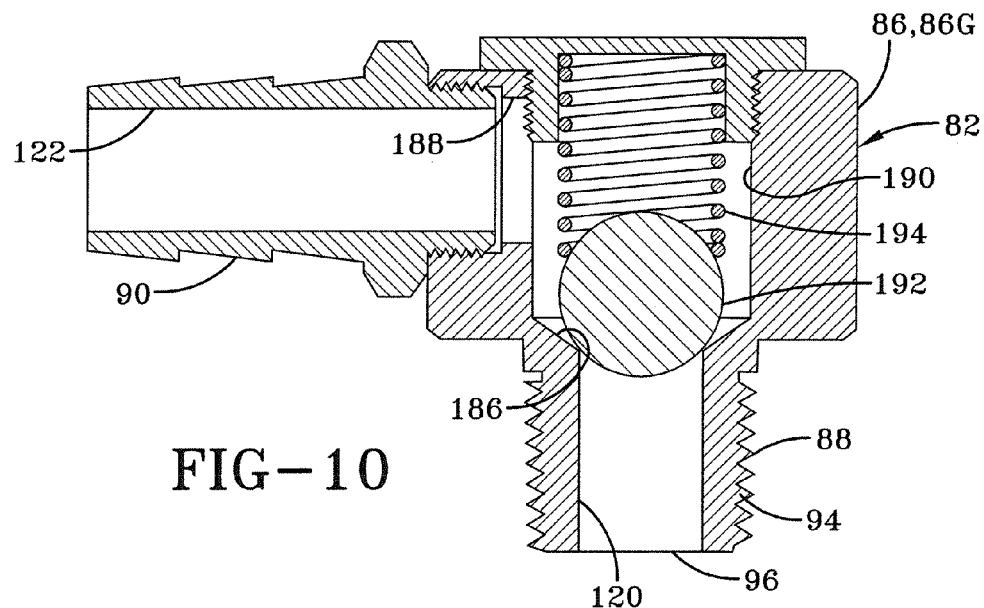
FIG. 10 is an enlarged cross-sectional view of a seventh exemplary check valve for use in the vehicle axle vent system shown in FIG. 3.

Turning to FIG. 10, a seventh exemplary valve body 86G is shown. Shoulder 88 is integrally formed with or is mechanically connected to valve body 86G, and the valve body includes a tapered inlet 186 that is fluidly connected to shoulder bore 120. Hose barb 90 is also integrally formed with or is mechanically connected to valve body 86G, and the valve body includes an outlet 188 that is fluidly connected to hose barb bore 122. A valve chamber 190 is formed between and is fluidly connected to valve body inlet 186 and valve body outlet 188. A ball 192 is disposed in valve chamber 190 and is retained against tapered inlet 186 by a spring 194. When there is an increase in pressure inside axle 10 (FIG. 3) and/or wheel end assembly 12 (FIG. 1) above atmospheric pressure, air flows through bore 120 in shoulder 88, overcomes the bias of spring 194 and moves ball 192 away from inlet 186. The air flows through inlet 186, past ball 192, through valve chamber 190 to hose barb bore 122, and out to atmosphere through tube 84 (FIG. 3), thereby relieving excess pressure inside axle 10 and/or wheel end assembly 12.

To maintain a preferred pressure differential of less than about three (3) to five (5) psi, and a more preferred pressure differential of about one (1) psi or less, ball 192 is capable of moving or opening at a preferred crack pressure of less than about one (1) psi. Opening at such a low crack pressure enables check valve 82 to relieve low pressure increases that may unduly stress wheel end assembly main seal 32 (FIG. 1), such as those caused by an increase in ambient temperature, by dynamic heating of wheel end assembly 12, or by changes in atmospheric pressure.

In addition, the configuration of ball 192, spring 194, and inlet 186 enables a high volume of air flow through valve chamber 190, thereby quickly and efficiently venting or exhausting pressure in axle 10 and/or wheel end assembly 12 in the event of a high pressure increase, such as a leak in pneumatic conduit 44 (FIG. 1) or rotary union 42 when tire inflation system 40 is employed. Valve body 86G enables high air flow venting, preferably including a flow rate of at least about five (5) to ten (10) scfm, and more preferably between about eight (8) and eight point five (8.5) scfm, when the pressure differential is about three (3) psi or less. Of course, the flow rate of valve body 86G will be different for other pressure differentials.

In the event that water or other contaminants enter valve body 86G through hose barb bore 122, ball 192, assisted by the bias of spring 194, seats in inlet 186 to seal valve chamber 190, thereby preventing water and/or other contaminants from ingressing through shoulder bore 120 into axle 10 and/or wheel end assembly 12.

Figure 11:
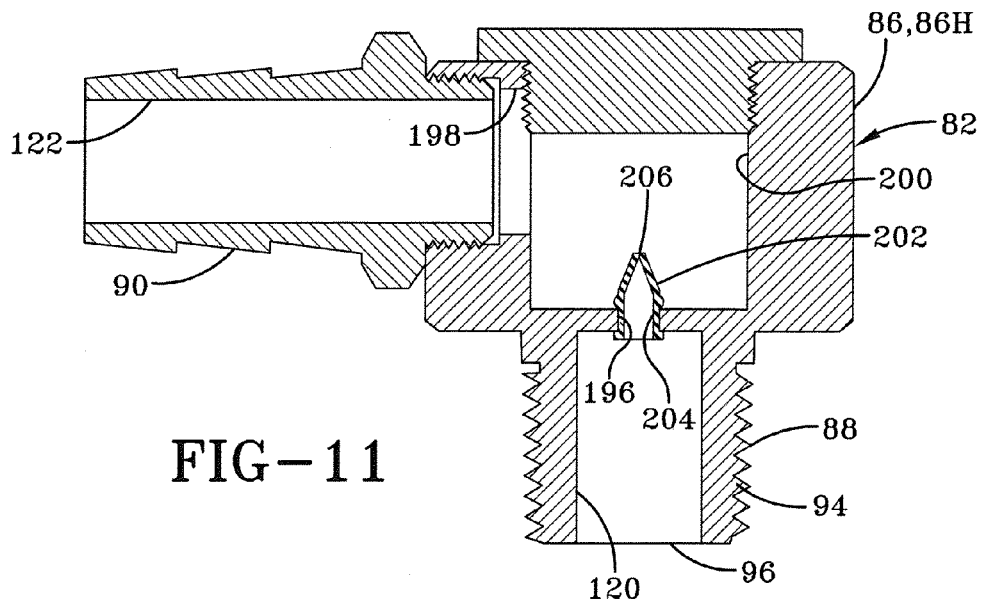
FIG. 11 is an enlarged cross-sectional view of an eighth exemplary check valve for use in the vehicle axle vent system shown in FIG. 3.

With reference now to FIG. 11, an eighth exemplary valve body 86H is shown. Shoulder 88 is integrally formed with or is mechanically connected to valve body 86H, and the valve body includes an inlet 196 that is fluidly connected to shoulder bore 120. Hose barb 90 is also integrally formed with or is mechanically connected to valve body 86H, and the valve body includes an outlet 198 that is fluidly connected to hose barb bore 122. A valve chamber 200 is formed between and is fluidly connected to valve body inlet 196 and valve body outlet 198. A small duckbill valve 202 is disposed in valve body 86H between chamber 200 and inlet 196, and includes an inlet orifice 204 and an outlet orifice 206. When there is an increase in pressure inside axle 10 (FIG. 3) and/or wheel end assembly 12 (FIG. 1) above atmospheric pressure, air flows through bore 120 in shoulder 88, through duckbill valve inlet 204, and through duckbill valve outlet 206. The air then flows through valve chamber 190 to hose barb bore 122 and out to atmosphere through tube 84 (FIG. 2), thereby relieving excess pressure inside axle 10 and/or wheel end assembly 12.

To maintain a preferred pressure differential of less than about three (3) to five (5) psi, and a more preferred pressure differential of about one (1) psi or less, duckbill valve 202 is capable of opening at a preferred crack pressure of less than about one (1) psi. Opening at such a low crack pressure enables check valve 82 to relieve low pressure increases that may unduly stress wheel end assembly main seal 32 (FIG. 1), such as those caused by an increase in ambient temperature, by dynamic heating of wheel end assembly 12, or by changes in atmospheric pressure. In the event that water or other contaminants enter valve body 86H through hose barb bore 122, duckbill valve outlet orifice 206 flexes to a pinched or closed position to seal valve chamber 200, thereby preventing water and/or other contaminants from ingressing through shoulder bore 120 into axle 10 and/or wheel end assembly 12.

Figure 12:
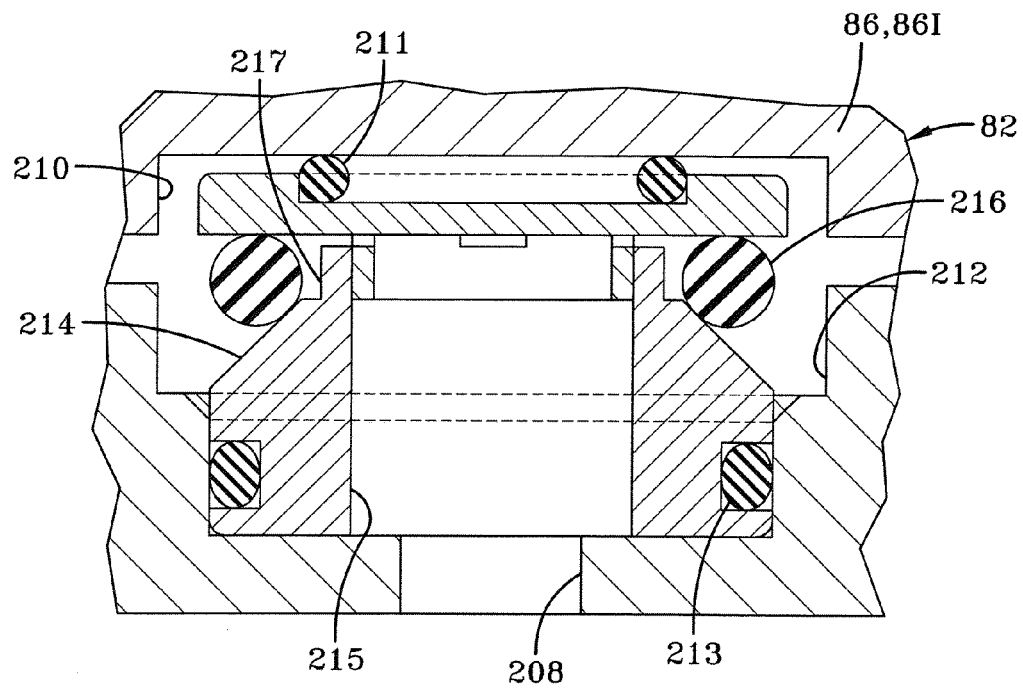
FIG. 12 is an enlarged fragmentary cross-sectional view of a portion of a ninth exemplary check valve for use in the vehicle axle vent system shown in FIG. 3, with hidden parts represented by broken lines.

Turning to FIG. 12, a ninth exemplary valve body 86I is shown. Shoulder 88 (FIG. 11) is integrally formed with or is mechanically connected to valve body 86I, and the valve body includes an inlet 208 that is fluidly connected to shoulder bore 120 (FIG. 11). Hose barb 90 (FIG. 11) is also integrally formed with or is mechanically connected to valve body 86I, and the valve body includes an outlet 210 that is fluidly connected to hose barb bore 122 (FIG. 11). A valve chamber 212 is formed between and is fluidly connected to valve body inlet 208 and valve body outlet 210.

A tapered plug 214 is disposed in valve chamber 212, and is formed with a central bore 215 and an annular bore 217. A pair of sealing o-rings 211 and 213, respectively, seal the interface between tapered plug 214 and valve chamber 212, and a displaceable o-ring 216 seats on the tapered plug adjacent annular bore 217. When there is an increase in pressure inside axle 10 (FIG. 3) and/or wheel end assembly 12 (FIG. 1) above atmospheric pressure, air flows through bore 120 in shoulder 88, through central bore 215 in tapered plug 214, and through annular bore 217. When air flows through annular bore 217 in tapered plug 214, displaceable o-ring 216 is displaced by the air flow to create a gap between the tapered plug and the displaceable o-ring. The air flows through the gap between tapered plug 214 and displaceable o-ring 216, through valve chamber 212 to hose barb bore 122, and out to atmosphere through tube 84 (FIG. 3), thereby relieving excess pressure inside axle 10 and/or wheel end assembly 12.

To maintain a preferred pressure differential of less than about three (3) to five (5) psi, and a more preferred pressure differential of about one (1) psi or less to maximize the life of main seal 32, displaceable o-ring 216 is capable of displacing from tapered plug 214 at a preferred crack pressure of less than about one (1) psi. Opening at such a low crack pressure enables check valve 82 to relieve low pressure increases that may unduly stress wheel end assembly main seal 32 (FIG. 1), such as those caused by an increase in ambient temperature, by dynamic heating of wheel end assembly 12, or by changes in atmospheric pressure.

In addition, the configuration of tapered plug 214 and displaceable o-ring 216 enables a high volume of air flow through valve chamber 212, thereby quickly and efficiently venting or exhausting pressure in axle 10 and/or wheel end assembly 12 in the event of a high pressure increase, such as a leak in pneumatic conduit 44 (FIG. 1) or rotary union 42 when tire inflation system 40 is employed. Valve body 86I enables high air flow venting, preferably including a flow rate of at least about five (5) to ten (10) scfm, and more preferably between about eight (8) and eight point five (8.5) scfm, when the pressure differential is about three (3) psi or less. Of course, the flow rate of valve body 86I will be different for other pressure differentials.

In the event that water or other contaminants enter valve body 86I through hose barb bore 122, displaceable o-ring 216 compresses against tapered plug 214 to seal valve chamber 212, thereby preventing water and/or other contaminants from proceeding through shoulder bore 120 into axle 10 and/or wheel end assembly 12.

Figure 13:
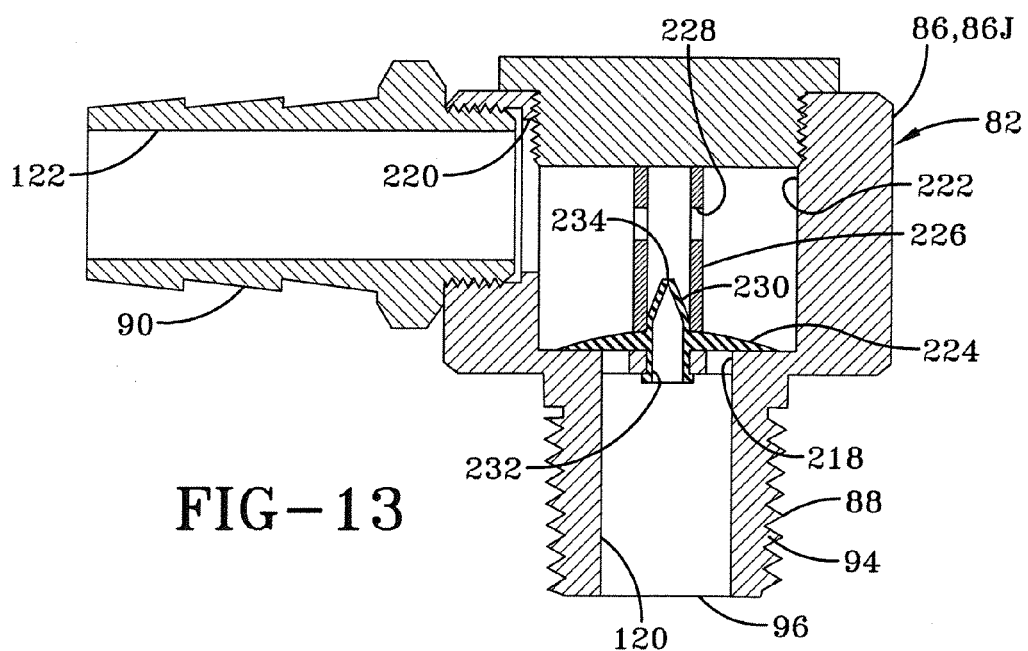
FIG. 13 is an enlarged cross-sectional view of a tenth exemplary check valve for use in the vehicle axle vent system shown in FIG. 3.

Turning to FIG. 13, a tenth exemplary valve body 86J is shown. Shoulder 88 is integrally formed with or is mechanically connected to valve body 86J, and the valve body includes an inlet or inlet orifice 218 that is fluidly connected to shoulder bore 120. Hose barb 90 is also integrally formed with or is mechanically connected to valve body 86J, and the valve body includes an outlet 220 that is fluidly connected to hose barb bore 122. A valve chamber 222 is formed between and is fluidly connected to valve body inlet orifice 218 and valve body outlet 220. A rubber diaphragm 224 is disposed in valve chamber 222, and a cylindrical pin 226 urges the diaphragm against the wall of the valve chamber to cover inlet orifice 218. Disposed in the center of diaphragm 224 is a small duckbill valve 230, which includes an inlet orifice 232 and an outlet orifice 234. Duckbill valve 230 and diaphragm 224 may be discrete components, or may be integrally formed or molded.

Duckbill valve 230 opens at a preferred crack pressure of about one (1) psi or less, thereby maintaining a preferred pressure differential of less than about three (3) to five (5) psi, and a more preferred pressure differential of about one (1) psi or less, when there is a low pressure increase inside axle 10 (FIG. 3) and/or wheel end assembly 12 (FIG. 1). Opening at such a low crack pressure enables venting through duckbill valve 230 to relieve a pressure increase that is caused by an increase in ambient temperature, by dynamic heating of wheel end assembly 12, or by changes in atmospheric pressure. More particularly, in the event of a low pressure increase, air flows through bore 120 in shoulder 88, through duckbill valve inlet 232, and through duckbill valve outlet 234. The air then flows through cylindrical pin 226, through an opening 228 formed in the pin, through valve chamber 222 to hose barb bore 122, and out to atmosphere through tube 84 (FIG. 3), thereby relieving excess pressure inside axle 10 and/or wheel end assembly 12.

When there is a high pressure increase inside axle 10 and/or wheel end assembly 12, such as in the event of a leak in pneumatic conduit 44 (FIG. 1) or rotary union 42 when tire inflation system 40 is employed, a high volume of air flows past diaphragm 224. More particularly, in the event of such a high pressure increase, air flows through bore 120 in shoulder 88 and through inlet orifice 218, causing diaphragm 224 to flex toward cylindrical pin 226. The air flows past diaphragm 224, through valve chamber 222 to hose barb bore 122 and out to atmosphere through tube 84 (FIG. 3), thereby relieving excess pressure inside axle 10 and/or wheel end assembly 12. Diaphragm 224 enables high air flow venting, preferably including a flow rate of at least about five (5) to ten (10) scfm, and more preferably between about eight (8) and eight point five (8.5) scfm, when the pressure differential is about three (3) psi or less. Of course, the flow rate of diaphragm 224 will be different for other pressure differentials.

In the event that water or other contaminants enter valve body 86J through hose barb bore 122, the urging of diaphragm 224 by cylindrical pin 226 causes the diaphragm to engage the wall of valve chamber 222 to cover inlet orifice 218. Likewise, duckbill valve outlet orifice 234 flexes to a pinched or closed position. In this manner, valve chamber 222 is sealed, thereby preventing water and/or other contaminants from ingressing through shoulder bore 120 into axle 10 and/or wheel end assembly 12.

The construction and arrangement of vehicle axle vent system 80 provides a system that relieves pressure build-up in axle 10 and/or wheel end assembly 12. The mounting of check valve 82 on axle 10, combined with the mounting of tube 84 on the check valve, acts to preserve the integrity of the check valve by protecting the check valve from road debris and build-up of contaminants on the valve outlet. This protection of check valve 82 enables continued functioning of the valve, which in turn prevents contaminants from entering axle 10 and/or wheel end assembly 12, thereby extending the life of the components of the wheel end assembly.

In addition, the downwardly-extending orientation of tube 84 minimizes the retention of moisture and other contaminants in the tube, which in turn reduces the probability of contaminants remaining near check valve 82, and also reduces the possibility of moisture or other contaminants freezing in and thus obstructing the tube. The orientation of tube 84 therefore provides an open and protected vent path that prevents contaminants from entering axle 10 and/or wheel end assembly 12, thereby extending the life of the components of the wheel end assembly. The downwardly-extending orientation of tube 84 and the flexible nature of the tube also enable vibration caused by over-the-road travel of the vehicle to dislodge ice that may have formed in the tube, thereby reducing the ability of ice to obstruct the vent path.

Moreover, check valve 82 opens at a low pressure that enables the venting or exhausting of even small increases in pressure in axle 10 and/or wheel end assembly 12 that are due to increases in ambient temperature, dynamic heating of the wheel end assembly, or changes in altitude/atmospheric pressure. Such venting or exhausting of small pressure increases desirably preserve the life of wheel end assembly main seal 32. Check valve 82 is also capable of venting or exhausting a high flow volume, which preserves the life of wheel end assembly main seal 32 in the event of a high pressure increase, such as a leak or rupture of supply conduit 44 or a leak in rotary union 42 in the event that tire inflation system 40 is employed on the heavy-duty vehicle. Check valve 82 preferably also enables equalization of pressure and thus relief of vacuum conditions inside axle 10 and/or wheel end assembly 12, again preserving the integrity and/or life of main seal 32.

The configuration of vehicle axle vent system 80, including check valve 82 being mounted on axle 10, and vent tube 84 being flexible, being of a relatively short length, and being mounted on the check valve, provides a compact design. Such a compact design in turn provides convenient and easy installation and/or adjustment of vehicle axle vent system 80, as well as installation of the system on axle 10 in a confined and thus desirably protected space.

The compact design also enables a preferred installation of vehicle axle vent system 80 in a protected location within suspension assembly beam 108, which is also a relatively stress-free location on axle 10. By including a relatively simple construction, vehicle axle vent system 80 is economical to manufacture, is easy to install, and is lightweight while also being durable.

The present invention also includes a method of manufacturing, assembling, and/or using a vehicle axle vent system 80. The method includes steps in accordance with the description that is presented above and shown in FIGS. 3-13.

It is to be understood that the structure and arrangement of the above-described vehicle axle vent system 80 may be altered or rearranged without affecting the overall concept or operation of the invention. For example, vent system 80 may be mounted at other locations along axle 10 and/or wheel end assembly 12; other types of check valves 82 than those shown and described above may be employed, including the alternative use of a simple filter or screen; other types of vacuum-relieving features in check valve 82 than those shown and described above may be employed, such as a sintered or porous diaphragm seat ring, a sintered or porous diaphragm mounting pin, a Gore-Tex patch, a sintered or porous ball, and/or a diaphragm with a ball float; tube 84 may be formed of other materials than those described above, and may be of other diameters, lengths, and/or cross-sections than those described above; and the vent system may be employed on vehicles, axles and/or wheel end assemblies that include other types of tire inflation systems than those shown and described above, and on vehicles, axles and/or wheel end assemblies that do not include tire inflation systems, without affecting the overall concept or operation of the invention.

In addition, vehicle axle vent system 80 may be employed with other types of axles, wheel end assemblies, and/or axle/suspension systems than those shown and described above, without affecting the overall concept or operation of the invention. Moreover, while reference herein has been made generally to a heavy-duty vehicle for the purpose of convenience, it has been with the understanding that such reference includes trucks, tractor-trailers and semi-trailers, and trailers thereof.

Accordingly, the improved vehicle axle vent system is simplified, provides an effective, safe, inexpensive, and efficient structure and method which achieves all the enumerated objectives, provides for eliminating difficulties encountered with prior art vehicle axle vent systems, and solves problems and obtains new results in the art.

In the foregoing description, certain terms have been used for brevity, clarity and understanding; but no unnecessary limitations are to be implied therefrom beyond the requirements of the prior art, because such terms are used for descriptive purposes and are intended to be broadly construed. Moreover, the present invention has been described with reference to exemplary embodiments. It shall be understood that this illustration is by way of example and not by way of limitation, as the scope of the invention is not limited to the exact details shown or described. Potential modifications and alterations will occur to others upon a reading and understanding of this disclosure, and it is understood that the invention includes all such modifications and alterations and equivalents thereof.

Having now described the features, discoveries and principles of the invention, the manner in which the improved vehicle axle vent system is constructed, arranged and used, the characteristics of the construction and arrangement, and the advantageous, new and useful results obtained; the new and useful structures, devices, elements, arrangements, parts and combinations are set forth in the appended claims.

What is claimed is:

1. A vent system for an axle of a heavy-duty vehicle, said vent system comprising:
    a check valve including:
        a first end mounted on said axle;
        a second end; and
        a body disposed between said first and second ends and being in selective fluid communication with an interior of said axle, said body including means to enable air flow from said axle interior to atmosphere when a pressure increase in the axle interior is less than about one pound per square inch and means to selectively enable air flow from said axle interior to atmosphere at a flow rate of at least about five standard cubic feet per minute; and
    a vertically-extending exhaust tube including:
        a first end mounted on said second end of said check valve; and
        a second end being open to atmosphere and being in fluid communication with said check valve body, whereby said vent system selectively exhausts air from said axle interior to atmosphere to relieve buildups of pneumatic pressure in said axle.

2. The vent system for an axle of a heavy-duty vehicle of claim 1, wherein said exhaust tube extends downwardly from said check valve.

3. The vent system for an axle of a heavy-duty vehicle of claim 1, wherein said exhaust tube includes a length of from about four inches to about six inches.

4. The vent system for an axle of a heavy-duty vehicle of claim 1, wherein said axle extends through a sleeve, and said check valve first end is mounted on the axle in a window formed in said sleeve.

5. The vent system for an axle of a heavy-duty vehicle of claim 1, wherein said check valve body means selectively enable air flow from said axle interior to atmosphere at a flow rate of at least about five to ten standard cubic feet per minute when a pressure differential is less than or equal to about three pounds per square inch.

6. The vent system for an axle of a heavy-duty vehicle of claim 5, wherein said check valve body means selectively enable air flow from said axle interior to atmosphere at a flow rate of at least about eight to eight point five standard cubic feet per minute when a pressure differential is less than or equal to about three pounds per square inch.

7. The vent system for an axle of a heavy-duty vehicle of claim 1, wherein said check valve body includes:
    a valve chamber disposed between and being in fluid communication with said first check valve end and said second check valve end;
    a rubber diaphragm disposed in said valve chamber; and
    a retention pin disposed in said valve chamber and extending through an opening formed in said diaphragm, said retention pin retaining a position of said diaphragm in said valve chamber.

8. The vent system for an axle of a heavy-duty vehicle of claim 7, wherein said retention pin includes a portion formed of a porous material to prevent a vacuum condition from forming in said axle interior.

9. The vent system for an axle of a heavy-duty vehicle of claim 1, wherein said check valve body includes:
    a valve chamber disposed between and being in fluid communication with said first check valve end and said second check valve end;
    a rubber diaphragm disposed in said valve chamber;
    a retention pin disposed in said valve chamber and engaging said diaphragm; and
    a spring integrated with said retention pin, whereby selective flow of a low volume of air to flow through said valve chamber is enabled by flexing of said diaphragm about the retention pin and said spring, and selective flow of a higher volume of air through the valve chamber is enabled by a force of said higher air volume overcoming a bias of the spring and moving the diaphragm.

10. The vent system for an axle of a heavy-duty vehicle of claim 1, wherein said check valve body includes:
    a valve chamber disposed between and being in fluid communication with said first check valve end and said second check valve end;
    a rubber diaphragm disposed in said valve chamber; and
    a pin disposed in said the valve chamber and being connected to said diaphragm, said pin urging the diaphragm against a wall of said valve chamber.

11. The vent system for an axle of a heavy-duty vehicle of claim 1, wherein said check valve body includes:
    a valve chamber disposed between and being in fluid communication with said first check valve end and said second check valve end;
    a seat disposed in said valve chamber and being formed with an opening;
    a rubber diaphragm disposed in said valve chamber; and
    a pin disposed in said the valve chamber and being connected to said diaphragm, said pin urging the diaphragm against said seat.

12. The vent system for an axle of a heavy-duty vehicle of claim 11, wherein said seat is formed of a porous material to prevent a vacuum condition from forming in said axle interior.

13. The vent system for an axle of a heavy-duty vehicle of claim 1, wherein said check valve body includes:
    a valve chamber disposed between and being in fluid communication with said first check valve end and said second check valve end;
    a valve chamber inlet formed in said valve body proximate said first check valve end, said inlet being formed with an orifice; and an umbrella-shaped member disposed in said valve chamber, said umbrella-shaped member including an upper portion to seal said inlet orifice, and a ball-shaped lower portion to retain said upper portion near the inlet orifice, and a neck extending between the upper portion and said through the inlet orifice.

14. The vent system for an axle of a heavy-duty vehicle of claim 13, said check valve body further comprising a retention pin disposed in said valve chamber adjacent said umbrella-shaped member upper portion.

15. The vent system for an axle of a heavy-duty vehicle of claim 1, wherein said check valve body includes:
    a valve chamber disposed between and being in fluid communication with said first check valve end and said second check valve end;
    a tapered valve chamber inlet formed in said valve body proximate said first check valve end;
    a ball disposed in said valve chamber; and
    a spring disposed in said valve chamber in contact with said ball to selectively retain a position of the ball against said tapered valve chamber inlet.

16. The vent system for an axle of a heavy-duty vehicle of claim 1, wherein said check valve body includes:
    a valve chamber disposed between and being in fluid communication with said first check valve end and said second check valve end;
    a valve chamber inlet formed in said valve body proximate said first check valve end; and
    a duckbill valve disposed in said valve body between said valve chamber and said valve chamber inlet.

17. The vent system for an axle of a heavy-duty vehicle of claim 16, said check valve body further comprising:
    a diaphragm disposed in said valve chamber;
    a cylindrical pin disposed in said valve chamber adjacent said diaphragm; and
    wherein said duckbill valve is disposed in a center of said diaphragm.

18. The vent system for an axle of a heavy-duty vehicle of claim 1, wherein said check valve body includes:
    a valve chamber disposed between and being in fluid communication with said first check valve end and said second check valve end;
    a tapered plug disposed in said valve chamber, said plug being formed with a central bore and an annular bore;
    at least one o-ring disposed in said valve chamber adjacent said tapered plug to seal an interface between the tapered plug and the valve chamber; and
    a displaceable o-ring disposed on said tapered plug adjacent said annular bore.

\* \* \* \* \*

UNITED STATES PATENT AND TRADEMARK OFFICE
CERTIFICATE OF CORRECTION

PATENT NO.        : 8,925,574 B2  
APPLICATION NO.   : 13/588289  
DATED             : January 6, 2015  
INVENTOR(S)       : Matt J. Wilson et al.

It is certified that error appears in the above-identified patent and that said Letters Patent is hereby corrected as shown below:

In the Claims

Claim 10, Column 20, line 45, after the word "said" delete "the".

Claim 11, Column 20, line 56, after the word "said" delete "the".

Claim 13, Column 21, line 5, after the words "portion and" delete the word "said".

Claim 13, Column 21, line 6, before the word "the" delete the word "through".

Signed and Sealed this  
Thirty-first Day of March, 2015

Michelle K. Lee  
*Director of the United States Patent and Trademark Office*